3,513,244
METHODS OF LOWERING BLOOD PRESSURE IN ANIMALS BY ADMINISTERING SECONDARY AND TERTIARY AMINES
Maurice Ward Gittos, Slough, John William James, Langley, and Leslie Frederick Wiggins, Wargrave, England, assignors to Aspro-Nicholas Limited, London, England, a limited company of Great Britain
No Drawing. Filed July 10, 1967, Ser. No. 652,028
Claims priority, application Great Britain, July 16, 1966, 32,067/66
Int. Cl. A61k *27/00*; A61l *13/00*
U.S. Cl. 424—320                                13 Claims

ABSTRACT OF THE DISCLOSURE

A number of secondary and tertiary aminoindanes and amino-1,2,3,4-tetrahydronaphthalenes are disclosed. They have useful pharmacological properties in that, when administered to hypertensive animals, including humans, they lower the blood pressure of these animals. Pharmaceutical compositions containing these compounds may be administered orally, rectally or parenterally in dosage unit form, each dosage unit containing from 1 to 150 mg. of active ingredient. Up to 2 or 3 dosage units may be administered 4 times daily. Reduced dosages may be used for maintenance therapy.

This invention relates to certain secondary and tertiary amines having hypotensive activity and in particular to methods of treatment involving the administration of said amines.

The amines of the present invention are represented by the formula:

$$R_1\text{—}N\text{—}R_2$$
$$|$$
$$R_3 \quad\quad\quad (I)$$

wherein $R_1$ is —$CH_2$—$C\equiv C$—$R_4$ and $R_4$ is hydrogen, lower alkyl, phenyl or a carboxylic amide group of the formula

in which $R_5$ and $R_6$, which may be the same or different, are each hydrogen or lower alkyl, $R_2$ is hydrogen, lower alkyl, cyclopropyl or propargyl; $R_3$ is an indane or 1,2,3,4-tetrahydronaphthalene nucleus to which the nitrogen atom in Formula I is attached in the 1-position and the benzene rings of which may be substituted by one or more of the same or different hydrogen, methyl, ethyl, halogen, for example chlorine, bromine and fluorine, hydroxy or lower alkoxy groups; and pharmaceutically acceptable salts thereof.

The terms "lower alkyl" and "lower alkoxy" are used in this specification as meaning respectively alkyl and alkoxy groups containing from 1 to 4 carbon atoms, for example methyl, ethyl, propyl, isopropyl, butyl, t.-butyl, methoxy, isopropoxy, isobutoxy, s.-butoxy and t.-butoxy.

Within the group of compounds encompassed by Formula I, there is a preferred group of compounds wherein $R_1$ is propargyl and/or $R_2$ is hydrogen and/or the benzene rings in the $R_3$ groups are substituted other than by hydrogen and preferably are substituted by lower alkoxy.

Specific compounds which may be used in accordance with the present invention include:

N-propargyl-1-aminoindane
N-methyl-N-propargyl-1-aminoindane
N-(3'-dimethylaminocarbonyl propargyl)-1-aminoindane
N-(3'-t.-butyl propargyl)-1-aminoindane
N-(3'-ethyl propargyl)-6-chloro-1-aminoindane
N-t.butyl-N-propargyl-1-aminoindane
N-propargyl-5-methoxy-1-aminoindane
N-propargyl-6-methoxy-1-aminoidane
N-propargyl-5,7-dimethoxy-1-aminoindane
N,N-dipropargyl-6-ethoxy-1-aminoindane
N,N-dipropargyl-4-butoxy-1-aminoindane
N-propargyl-6-methyl-1-aminoindane
N-propargyl-7-ethyl-1-aminoindane
N-ethyl-N-propargyl-6,7-dimethyl-1-aminoindane
N-methyl-N-propargyl-5-hydroxy-1-aminoindane
N-propargyl-6-hydroxy-1-aminoindane
N-propargyl-5-chloro-1-aminoindane
N-propargyl-5,6-dibromo-1-aminoindane
N-propargyl-7-fluoro-1-aminoindane
N-butyl-N-propargyl-5-chloro-7-methoxy-1-aminoindane
N-propargyl-4-methyl-6-bromo-1-aminoindane
N-propargyl-1-amino-1,2,3,4-tetrahydronaphthalene
N,N-dipropargyl-1-amino-1,2,3,4-tetrahydronaphthalene
N-N-dipropargyl-5-ethoxy-1-amino-1,2,3,4-tetrahydronaphthalene
N,N-dipropargyl-7-ethyl-1-amino-1,2,3,4-tetrahydronaphthalene
N,N-dipropargyl-8-butoxy-1-amino-1,2,3,4-tetrahydronaphthalene
N-propargyl-7-methoxy-1-amino-1,2,3,4-tetrahydronaphthalene
N-propargyl-6,7-dimethoxy-1-amino-1,2,3,4-tetrahydronaphthalene
N-propargyl-7-ethyl-1-amino-1,2,3,4-tetrahydronaphthalene
N-propargyl-6,7-dichloro-1-amino-1,2,3,4-tetrahydronaphthalene
N-propargyl-8-fluoro-1-amino-1,2,3,4-tetrahydronaphthalene
N-propargyl-6-methoxy-7-bromo-1-amino-1,2,3,4-tetrahydronaphthalene
N-propargyl-7-isobutoxy-1-amino-1,2,3,4-tetrahydronaphthalene
N-methyl-N-propargyl-1-amino-1,2,3,4-tetrahydronaphthalene
N-s.butyl-N-propargyl-1-amino-1,2,3,4-tetrahydronaphthalene
N-ethyl-N-propargyl-5-chloro-1-amino-1,2,3,4-tetrahydronaphthalene
N-(3'-aminocarbonyl propargyl)-1-amino-1,2,3,4-tetrahydronaphthalene
N-(3'-phenyl propargyl)-1-amino-1,2,3,4-tetrahydronaphthalene
N-propyl-N-propargyl-6-chloro-1-amino-1,2,3,4-tetrahydronaphthalene
N-methyl-N-propargyl-6,8-dibromo-1-amino-1,2,3,4-tetrahydronaphthalene
N-ethyl-N-propargyl-7-iodo-1-amino-1,2,3,4-tetrahydronaphthalene
N-butyl-N-propargyl-5,8-di-t.-butoxy-1-amino-1,2,3,4-tetrahydronaphthalene
N-methyl-N-propargyl-6-hydroxy-1-amino-1,2,3,4-tetrahydronaphthalene
N-propargyl-7-hydroxy-1-amino-1,2,3,4-tetrahydronaphthalene
N-propargyl-6,7-dihydroxy-1-amino-1,2,3,4-tetrahydronaphthalene The compounds of Formula I may be made by known methods. Thus, for example, the compounds of formula I may be prepared by reacting a compound of the formula:

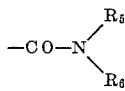             (II)

wherein $R_3$ is as defined in Formula I and the oxygen atom is in the 1-position, with a N-substituted formamide of the formula:

$$HCONHR_7 \quad (III)$$

wherein $R_7$ represents $R_2$ (other than hydrogen) or $R_1$, and submitting the resultant formamide to an acid or alkaline hydrolysis to form a compound of the formula:

$$R_3—NH—R_7 \quad (IV)$$

wherein $R_3$ and $R_7$ are as defined above (the compounds of Formula IV wherein $R_7$ represents $R_1$ or $R_2$, $R_2$ being propargyl, being of course the secondary amines of the present invention), and thereafter, if desired (when $R_7$ represents $R_1$ or $R_2$, $R_2$ being propargyl) reacting the compound of Formula IV with a lower alkylating, cyclopropylating or propargylating agent, and necessarily (when $R_7$ represents $R_2$ which in turn is lower alkyl or cyclopropyl) reacting the compound of Formula IV with a propargylating agent, to produce the required compound of Formula I in which $R_2$ is lower alkyl, cyclopropyl or propargyl, the secondary and tertiary amines produced by the foregoing reactions being isolated either per se or as pharmaceutically acceptable salts thereof. Suitable lower alkylating, propargylating and cyclopropylating agents for use in the above reaction include lower alkyl, propargyl and cyclopropyl halides, for example chlorides, bromides and iodides, sulphates, benzenesulphonates and p-toluenesulphonates and the alkylating reaction is advantageously carried out in an inert solvent such as ether, benzene, toluene or dioxan, and in the presence of a proton acceptor, for example an excess of the compound of Formula IV or an organic base such as an alkali metal, an alkali metal amide or an alkali metal hydride. Due to the poor reactivity of the above cyclopropylating agents, it is preferred that, when a compound of Formula I in which $R_2$ is cyclopropyl is required, the N-cyclopropyl group be first attached to the ring and the resultant compound then propargylated. In the case where $R_2$ is methyl and $R_1$ is —$CH_2$—C≡C—$R_4$, the compound of Formula IV in which $R_7$ represents $R_1$ is advantageously methylated using a mixture of formaldehyde, formic acid and sodium formate.

The compounds of Formula I in which $R_1$ is

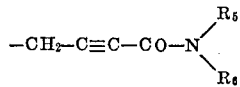

are preferably prepared by carboxylating the corresponding N-propargyl compound with a suitable base, such as an alkali metal amide or a Grignard reagent, esterifying the resultant acid with an alcohol, for example methanol, and thereafter reacting the resultant ester with an amine of the formula

to give the desired compound.

The compounds of Formula IV above may also be obtained by condensing a compound of the formula:

$$R_3—X \quad (V)$$

wherein $R_3$ is as defined in Formula I and X is halogen, preferably chlorine, in the 1-position, with an amine of the formula:

$$R_7—NH_2 \quad (VI)$$

wherein $R_7$ is as defined in Formula III, advantageously using an excess of the amine or an organic base, for example pyridine, as a proton acceptor.

Alternatively the compounds of Formula IV above may be prepared by reacting a compound of Formula II, with an amine of Formula VI, in a suitable solvent such as benzene and either simultaneously or thereafter reducing the resultant 1-aminoindene or 1-amino-3,4-dihydro-naphthalene to produce the required compound of Formula IV, the reduction being effected with a reducing agent such as palladium on charcoal or palladium on barium sulphate.

Salts of the compounds of Formula I include acid addition salts and resin salts. Acid addition salts comprise pharmaceutically acceptable, non-toxic addition salts with suitable acids, such as those with inorganic acids, for example hydrochloric, hydrobromic, nitric, sulphuric or phosphoric acids, or with organic acids, such as organic carboxylic acids, for example acetic, glycollic, maleic, tartaric, citric, o - acetyloxy - benzoic, nicotinic or isonicotinic acid, or organic sulphonic acids, for example methane sulphonic, ethane sulphonic, 2 - hydroxyethane sulphonic, p-toluene sulphonic or naphthalene 2-sulphonic acid.

A resulting acid addition salt may be converted into the free compound according to known methods, for example, by treating it with a base such as with a metal hydroxide, for example an alkali metal or alkaline earth metal hydroxide, for example lithium hydroxide, sodium hydroxide, potassium hydroxide or calcium hydroxide; a metal carbonate, such as an alkali metal or an alkaline earth metal carbonate or hydrogen carbonate, for example sodium, potassium or calcium carbonate or hydrogen carbonate; ammonia; with a hydroxyl ion exchange preparation, or with any other suitable reagent.

A resulting acid addition salt may also be converted into another acid addition salt according to known methods; for example, a salt with an inorganic acid may be treated with a metal salt, for example sodium, barium or silver salt, of an acid in a suitable diluent, in which a resulting inorganic salt is insoluble and is thus removed from the reaction medium. An acid addition salt may also be converted into another acid addition salt by treatment with an anion exchange preparation.

A free compound may be converted into an acid addition salt according to known methods, for example, by reacting the base, preferably a solution thereof in a solvent or solvent mixture, with the appropriate acid or a solution thereof, or with an anion exchange preparation and isolating the desired salt, which may be obtained in the form of a hydrate or may contain solvent of crystallization.

Resin salts of the compounds of Formula I, that is to say a substance in which the base is ionically bonded to an ion exchange material, may be obtained by contacting a cation exchange material with a solution in an inert, preferably polar, solvent of the base until the desired degree of saturation, usually substantially complete saturation, of the exchange material with the base has taken place. Suitable cationic exchange resins for this purpose are Zeocarb 225H, Dowex 50W-X8, Amberlite IR 120(H) and Amberlite IRC 50(H).

The class of compounds of Formula I (other than those where $R_4$ is phenyl or a carboxylic amide group) is described in the specifications of U.S. Pats. Nos. 3,201,470 and 3,253,037. The class of compounds is said in these specifications to possess monoamine oxidase inhibiting properties. The compounds are also said to be free from any central nervous system stimulating properties and said not to show any blood pressure raising effects. Indeed they are said not to have any effect at all on blood pressure.

It has now been discovered by the applicants that the compounds of Formula I are in fact extremely useful in the treatment of hypertension in animals, including humans, in that they cause a pronounced lowering of blood pressure. Accordingly the present invention provides a method of lowering the blood pressure of a hypertensive animal which method comprises administering to said animal in a sufficient non-toxic dose a compound of Formula I or a pharmaceutically acceptable salt thereof.

It will be appreciated that for medicinal use, the compounds of the invention can be made up, in accordance with pharmaceutical techniques well known per se, into pharmaceutical compositions comprising as an essential active ingredient a derivative of Formula I or a pharmaceutically acceptable acid addition salt thereof and a pharmaceutical carrier for the active ingredient. The pharmaceutiacl carrier may be an orally ingestible container for the active ingredient, for example a hard or soft gelatin capsule, or the carrier may be a pharmaceutical diluent or excipient which is in admixture with the active ingredient, for example starch, lactose, mannitol, sorbitol, calcium phosphate, talc, magnesium stearate, stearic acid, ethylcellulose, oil of theobroma, glycerin, or water, or a preservative such as for example methyl p-hydroxybenzoate. The composition may be in a form suitable for oral, parenteral or rectal administration and may therefore take the form of, for example a sterile solution or suspension in water or other liquids for parenteral administration or a suppository for rectal administration. However, for clinical practice the compound of the invention will preferably be administered by the oral route and hence the preferred compositions will be made up in a form suitable for oral ingestion, for example solutions, suspensions, emulsions, elixirs, syrups, powders or tablets.

For clinical use, the compositions are advantageously made up in a dosage unit form adapted for the desired mode of administration. Thus for oral administration, the dosage unit may take the form of, for example, a tablet, pill, sachet, cachet, packaged powder or a hard or soft gelatin capsule which may enclose a liquid, semi-liquid or solid composition of the pure active ingredient. For administration by injection, the dosage unit may take the form of a container such as an ampoule containing either an injectable solution or a composition from which such a solution may be prepared. The quantity of active ingredient in each dosage unit will be such that one or more, and conveniently no more than 2 or 3, units are required for each therapeutic administration. For example, the dosage unit for use in humans may contain from 1 to 150, advantageously 5 to 100 mg. of the active ingredient. The dosage units may be administered from two to four times daily depending on the condition of the patient. The number of dosages per day and/or the size of each dosage may be reduced during maintenance therapy, i.e. after the initial high blood pressure has been lowered to an acceptable level.

The following examples illustrate the preparation of compounds and compositions in accordance with the invention.

EXAMPLE 1

Tablets each having the following composition were prepared as described below:

N-propargyl-1-aminoindane hydrochloride—60 mg.
Lactose—144 mg.
Maize starch (dried)—35 mg.
Ethylcellulose N.100 [1]—4 mg.
Talc—6 mg.
Magnesium stearate—1 mg.

[1] Ethylcellulose N.100 is a commercially available ethoxylated cellulose having an ethoxyl content of 47.5 to 49.0%. A 5% w./w. solution in 80 parts toluene/20 parts ethanol has a viscosity of 80 to 105 cp. at 25° C.

The N-propargyl-1-aminoindane hydrochloride, lactose and a proportion of the starch (20 mg./tablet) were passed through a No. 44 (B.S.S.) mesh sieve and mixed together. The mixed powders were massed with a 5% w./w. solution of ethylcellulose in isopropyl alcohol and the mass granulated through a No. 12 (B.S.S.) mesh sieve. The granules were dried at 40° C. and passed through a No. 16 (B.S.S.) mesh sieve. Finally the talc, magnesium stearate and the balance of the starch (all passed through a No. 60 (B.S.S.) mesh sieve) were added to the granules and the mixture compressed into tablets each weighing 250 mg. Two of such tablets when taken up to 4 times per day produced a marked lowering of the blood pressure of the patients to whom they were administered. After about 14 days treatment, a dose of only one tablet 3 times per day maintained the new lower level of blood pressure.

EXAMPLE 2

Tablets each having the following composition were prepared as described below:

N-propargyl-5-methoxy-1-aminoindane hydrochloride—50 mg.
Lactose—248 mg.
Maize starch (dried)—70 mg.
Ethylcellulose N.100—8 mg.
Talc—20 mg.
Magnesium stearate—4 mg.

The N-propargyl-5-methoxy-1-aminoindane hydrochloride, lactose and a proportion of the starch (40 mg./ tablet) were passed through a No. 44 (B.S.S.) mesh sieve and mixed together. The mixed powders were massed with a 5% w./w. solution of ethylcellulose in isopropyl alcohol and the mass granulated through a No. 12 (B.S.S.) mesh sieve. The granules were dried at 40° C. and then passed through a No. 16 (B.S.S.) mesh sieve. Finally the talc, magnesium stearate and the balance of the starch (all passed through a No. 60 (B.S.S.) mesh sieve) were added to the granules and the mixture compressed into tablets each weighing 400 mg.

EXAMPLE 3

Capsules each having the following composition were made up as described below:

N-propargyl-1-aminoindane hydrochloride—10 mg.
Lactose—140 mg.

The N-propargyl-1-aminoindane hydrochloride and lactose were passed through a No. 44 (B.S.S.) mesh sieve and well mixed together. The mixed powders were filled into hard gelatin capsules of suitable size so that each contained 150 mg. of the mixture.

EXAMPLE 4

Capsules each having the following composition were made up as described below:

N,N-dipropargyl-1-aminoindane hydrochloride—50 mg.
Lactose—80 mg.

This formulation was made up in the same way as described in Example 3 and filled into hard gelatin capsules so that each contained 130 mg. of the mixed powder.

EXAMPLE 5

Suppositories each having the following composition were made up as described below:

N-propargyl-1-amino-1,2,3,4-tetrahydronaphthalene hydrohloride—10 mg.
Oil of theobroma—0.995 g.

The N-propargyl-1-amino-1,2,3,4-tetrahydronaphthalene hydrochloride was passed through a No. 60 (B.S.S.) mesh sieve and triturated with the molten oil of theobroma at 45° C. to form a smooth suspension. The mixture was stirred well and poured into moulds each of nominal 1 g. capacity to produce suppositories. Each suppository contained 10 mg. of N-propargyl-1-amino-1,2,3,4-tetrahydronaphthalene hydrochloride.

EXAMPLE 6

Suppositories each having the following composition were made up as described below:

N - propargyl-6,7-dimethoxy-1-amino 1,2,3,4-tetrahydronaphthalene hydrochloride—50 mg.
Oil of theobroma—0.975 g.

This formulation was made up in the same way as described in Example 5 and each suppository contained 50 mg. of N-propargyl 6,7-dimethoxy-1-amino-1,2,3,4-tetrahydronaphthalene hydrochloride.

EXAMPLE 7

A sterile powder for the preparation of an injection solution of N-propargyl - N - methyl - 1 - aminoindane hydrochloride was prepared as described below:

A (i) The N-propargyl - N - methyl - 1 aminoindane hydrochloride was sterilised by contact with ethylene oxide and 5 mg. quantities transferred aseptically to the sterile final containers which were then aseptically sealed. When required for use this sterile powder may dissolved in 1 ml. or more of sterile normal saline solution for injection.

(ii) The N-propargyl - N - methyl - 1 - aminoindane hy-hydrochloride was sterilised by contact with ethylene oxide and 100 mg. quantities transferred aseptically to the sterile final containers which were then aseptically sealed. When required for use this sterile powder may be dissolved in 1 ml. or more of sterile normal saline solution for injection.

B (i) The N-propargyl - N - methyl - 1 - aminoindane hydrochloride was dissolved in distilled water so that the resultant solution contained 10 mg./ml. This solution was then filtered through a bacteria proof filter and transferred aseptically into the final sterile containers which were then freeze dried under aseptic conditions. This sterile freeze dried powder may then be dissolved in 1 ml. or more of normal saline solution for injection.

(ii) The N-propargyl - N - methyl - 1 - aminoindane hydrochloride was dissolved in distilled water so that the resultant solution contained 100 mg./ml. This solution was filtered through a bacteria proof filter and transferred aseptically into the final sterile containers which were then freeze dried under aseptic conditions. This sterile freeze dried powder may then be dissolved in 1 ml. or more of normal saline solution for injection.

EXAMPLE 8

Injection solutions of N-propargyl - 1 - aminoindane hydrochloride were prepared as described below:

(i) The N-propargyl - 1 - aminoindane hydrochloride was dissolved in normal saline for injection so that the resultant solution contained 5 mg./ml. This solution was then filtered through a bacteria proof filter and transferred aseptically to the final sterile containers.

(ii) The N-propargyl - 1 - aminoindane hydrochloride was dissolved in normal saline for injection so that the resultant solution contained 10 mg./ml. This solution was filtered through a bacteria proof filter and transferred aseptically to the final sterile containers.

(iii) The N-propargyl - 1 - aminoindane hydrochloride was dissolved in normal saline solution for injection so that the resultant solution contained 50 mg./ml. This solution was then filtered through a bacteria proof filter and transferred aseptically to the final sterile containers.

EXAMPLE 9

A syrup was prepared as described below:

N - (3' - dimethylaminocarbonyl propargyl)-1-amino-1, 2,34-tetrahydronaphthalene hydrochloride—1.0 g.
Glycerin—50.0 ml.
Liquid invert sugar—500.0 ml.
Methyl p-hydroxybenzoate—1.0 g.
Propyl p-hydroxybenzoate—0.4 g.
Propylene glycol—10.0 ml.
Distilled water—qs. to 1.0 litre The N-(3' - dimethylaminocarbonyl propargyl) - 1-amino - 1,2,3,4 - tetrahydronaphthalene was dissolved in 300 ml. of distilled water and the liquid invert sugar added to this solution.

Both the methyl and propyl p-hydroxybenzoates were dissolved in the propylene glycol with the aid of heat and the resultant solution diluted with the glycerin. This solution was then added to the prepared solution of the tetrahydronaphthalene hydrochloride and further distilled water added to give a final volume of 1 litre.

Each 5 ml. of prepared syrup contains 5 mg. of the active ingredient.

EXAMPLE 10

A syrup containing N-propargyl-1-aminoindane hydrochloride was prepared as described below:

N-propargyl-1-aminoindane hydrochloride—10.0 g.
Glycerin—50.0 ml.
Liquid invert sugar—500.0 ml.
Methyl p-hydroxybenzoate—1.0 g.
Propyl p-hydroxybenzoate—0.4 g.
Propylene glycol—10.0 ml.
Distilled water—qs. to 1.0 litre This syrup was made up in the manner described in Example 9. Each 5 ml. of the prepared syrup contains 50 mg. of the active ingredient.

It will be appreciated that in Examples 1 to 10, the active compound specified may be replaced in whole or in part by other compounds of the invention having the necessary pharmacological activity and that other pharmaceutically acceptable salts may be employed in place of the hydrochloride salts.

EXAMPLE 11

1-chloroindane (24 g.), propargylamine (12 g.), sodium iodide (0.1 g.) and ethanol (50 ml.) were warmed until the reaction subsided (about 2 hours) and the resulting mixture was then refluxed for 8 hours. Water (100 ml.) was added to the cooled mixture and dilute sodium hydroxide added until the mixture was strongly alkaline. The mixture was then extracted with ether and the ether layer washed three times with 2.5 N HCl (3× 25 ml.). A solid precipitated out of the acidic solution and was filtered off (M.P. 180° C.).

This is believed to be N:N-di(1-indanyl)-propargylamine hydrochloride. The acidic filtrate was basified with potassium carbonate solution and the oil isolated by ether extraction. The oil was N-propargyl - 1 - aminoindane, which distilled at 88–94° C./0.3 mm. Addition of ether and ethereal HCl precipitated the hydrochloride, which had a M.P. of 185–187° C. when recrystallised from isopropanol.

EXAMPLE 12

1-chloroindane (39.1 g.), sodium iodide (0.5 g.) and an ethanolic solution of methylamine (100 ml.; 33%) were mixed and allowed to stand for about 72 hours. The ethanol was evaporated off, water (100 ml.) added and the resulting oil extracted with ether. The ether extract was then washed with dilute hydrochloric acid (25 ml.), the acidic layer basified with potassium carbonate solution and the oil isolated by ether extraction. Distillation of the dried ether extract gave N-methyl-1-aminoindane, B.P. 74–76° C./0.5 mm.

An ethereal solution of propargyl bromide (3.45 g. in 20 ml. of ether) was slowly added to a stirred solution of the N-methyl-1-aminoindane (8.5 g.) in ether (20 ml.) and the mixture left for about 72 hours. The white precipitate was filtered off, washed with ether and the ether filtrate dried and distilled to give N-methyl-N-propargyl-1-aminoindane, B.P. 110–118° C./4.5 mm. Addition of ethereal HCl gave the hydrochloride, M.P. 201–203° C. when recrystallised from isopropanol.

EXAMPLE 13

A mixture of 1-chloroindane (13.42 g.; .088 mole) and cyclopropylamine (10 g.; 0.176 mole) was heated on a steam bath for 4½ hours, during which time two layers formed, the lower one solidifying on cooling. Petroleum ether, B.P. 40-60° C. (100 ml.) was added, the solid cyclopropylamine hydrochloride filtered off, and the petroleum ether evaporated off from the filtrate. The resulting residue was dissolved in ether (30 ml.) and then extracted with dilute hydrochloric acid (5 N). At this stage a white crystalline precipitate was formed which was filtered off and recrystallised from isopropanol to obtain N-cyclopropyl-1-aminoindane hydrochloride, M.P. 189–190° C. (4.8 g.). The separated acid layer was made alkaline with 5 N sodium hydroxide and the basic oil ether extracted. Addition of ethereal hydrogen chloride to the dried ether extract precipitated N-cyclopropyl-1-aminoindane hydrochloride as colourless crystals, M.P. 181–182° C. after recrystallisation from isopropanol (2.8 g.). Total yield 7.6 g.

A mixture of N-cyclopropyl-1-aminoindane (8.65 g.; 0.05 mole), propargyl bromide (3. g.; 0.025 mole) and methyl cyanide (30 ml.) was refluxed for 12 hours. The methyl cyanide was evaporated off under reduced pressure and the residue warmed with anhydrous ether. The solid remaining undissolved was filtered off and the filtrate distilled to yield N-propargyl-N-cyclopropyl-1-aminoindane, B.P. 98–100° C./0.5 mm. Treatment of the amine with ether and ethereal hydrogen chloride and crystallisation of the precipitated solid from ethyl methyl ketone yielded N-propargyl-N-cyclopropyl - 1-aminoindane hydrochloride, M.P. 130–3° C.

EXAMPLE 14

A mixture of 5,6-dimethoxy-1-indanone (19 g.; 0.099 mole), cyclopropylamine (6.7 g.; 0.1 mole) cyclopropylamine p-toluenesulphonate (0.1 g.), absolute ethanol (150 ml.), glacial acetic acid (6 ml.) and 5% palladium on barium sulphate (2 g.) was reacted at room temperature and atmospheric pressure. The warmed mixture was filtered, acidified with dilute hydrochloric acid, the ethanol evaporated off and the residue dissolved in water. The solution was extracted with ether, the aqueous layer separated and basified with dilute sodium hydroxide. The oily layer was isolated by ether extraction and distilled to give N-cyclopropyl - 5,6-dimethoxy - 1-aminoindane, B.P. 186–190° C./15 mm. This compound (17.9 g.; 0.08 mole), propargyl chloride (2.85 g.; 0.04 mole) and methanol were stirred together, refluxed for six hours and then left at room temperature overnight. The methanol was evaporated off, dry ether added to the residue and the solid remaining undissolved was filtered off. Distillation of the filtrate yielded N-propargyl-N-cyclopropyl-5,6-dimethoxy-1-aminoindane, B.P. 130–134° C./0.8 mm. Treatment of the base with ethereal hydrogen chloride and crystallisation of the solid from isopropanol gave N-propargyl-N-cyclopropyl-5,6-dimethoxy - 1-aminoindane hydrochloride, M.P. 147° C.

EXAMPLE 15

A mixture of 1-tetralone (58 g.), N-methylformamide (94.4 g.) formic acid (40 ml. 80%), anyhdrous magnesium chloride (4.86 g.) and a little powdered glass was heated slowly up to a temperature of 180°, the water and formic acid being allowed to distill off. The mixture was cooled, refluxed with conc. hydrochloric acid (40 ml.) for one hour, water (300 ml.) added and the oil separated by ether extraction (2×200 ml.). The aqueous solution was neutralised with dilute sodium hydroxide and the mixture again ether extracted. The ether extracts were combined, dried and distilled to give N-formyl-N-methyl-1,2,3,4-tetrahydronaphthalene, B.P. 98–122° C./0.1 mm. (53.7 g.) as a yellow liquid which crystallised on standing.

A mixture of N-formyl-N-methyl-1-amino - 1,2,3,4-tetrahydronaphthalene (4.5 g.), potassium hydroxide (23.4 g.), water (11 ml.) and ethanol (200 ml.) was refluxed for six hours and the ethanol then evaporated off. Water (100 ml.) was added to the residue and the oily layer ether extracted. The ether extract was washed with 5 N hydrochloric acid (40 ml.), the acid layer basified with 40% sodium hydroxide solution and the oil isolated by ether extraction. Distillation of the dried ether extract gave N-methyl-1-amino - 1,2,3,4-tetrahydronaphthalene B.P. 138° C./14 mm.

A solution of propargyl bromide (4.43 g.) in anhydrous ether (15 ml.) was slowly added to an ice cold solution of N-methyl-1-amino - 1,2,3,4-tetrahydronaphthalene (12 g.) in anhydrous ether (15 ml.), the mixture was allowed to stand at room temperature for one hour and then refluxed for one hour. The white precipitate was filtered off, and the ethereal solution distilled to give an amine B.P. 58–92° C./0.15 mm. Addition of ether and ethereal hydrogen chloride and recrystallisation of the precipitate from isopropanol gave as first crop N-methyl - 1-amino-1,2,3,4-tetrahydronaphthalene hydrochloride M.P. 135–137° C. followed by (as a second crop) N-methyl-N-propargyl-1-amino-1,2,3,4-tetrahydronaphthalene hydrochloride M.P. 172–175° C.

Using the previously described methods, the following compounds were also prepared:

N-ethyl-N-propargyl-1-aminoindane hydrochloride, M.P. 127–131° C.

N-methyl-N-propargyl-6-methyl - 1-aminoindane hydrochloride, M.P. 212–214° C.

N,N-dipropargyl - 1-aminoindane hydrochloride, M.P. 158–161° C.

Having regard to the foregoing disclosure, the following is claimed as the inventive and patentable embodiments thereof:

1. Method of lowering blood pressure in an animal body, which method comprises administering to said animal in a sufficient non-toxic dose a compound of the formula:

wherein:
$R_1$ is $-CH_2-C\equiv C-R_4$,
  $R_4$ is hydrogen, lower alkyl, phenyl or a carboxylic amide group of the formula

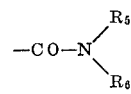

$R_5$ and $R_6$, which may be the same or different, are hydrogen or lower alkyl;
$R_2$ is hydrogen, lower alkyl, cyclopropyl or propargyl;
$R_3$ is an indane or 1,2,3,4-tetrahydronaphthalene nucleus attached to the nitrogen atom at the 1-position, the benzene rings of said nuclei being substituted by one or more of the same or different hydrogen, methyl, ethyl, halogen, hydroxy or lower alkoxy;
or a pharmaceutically acceptable salt thereof.

2. Method as claimed in claim 1, wherein $R_1$ is propargyl.

3. Method as claimed in claim 1, wherein $R_2$ is hydrogen.

4. Method as claimed in claim 1, wherein said benzene rings in the $R_3$ groups are substituted other than by hydrogen.

5. Method as claimed in claim 1, wherein said compound is selected from the group consisting of N-propargyl-1-aminoindane, N - methyl - N - propargyl - 1 - aminoindane, N-cyclopropyl-N - cyclopropyl-1-aminoindane, N-propargyl - N - cyclopropyl - 5,6 - dimethoxy-1-aminoindane, N-methyl-N-propargyl-1-amino-1,2,3,4 - tetrahydronaphthalene, N - ethyl - N - propargyl-1-aminoindane, N-methyl - N - propargyl-6-methyl-1-aminoindane, N,N-dipropargyl-1-aminoindane, and pharmaceutically acceptable salts thereof.

6. Method as claimed in claim 1, wherein said pharmaceutically acceptable salt is selected from the group consisting of acid addition salts and resin salts.

7. Method as claimed in claim 6, wherein said acid addition salt is the hydrochloride.

8. Method as claimed in claim 1, wherein said compound is administered in dosage unit form, each dosage unit containing from 1 to 150 mg. of said compound.

9. Method as claimed in claim 8, wherein up to 3 dosage units are administered up to 4 times per day.

10. Method as claimed in claim 1, wherein said compound is administered orally, rectally or parenterally.

11. A pharmaceutical composition for use in lowering blood pressure in an animal body comprising a blood pressure lowering amount of a compound having the formula:

$$R_4C \equiv C-CH_2NHR_3$$

wherein $R_4$ is phenyl or $CONH_2$ and $R_3$ is 1,2,3,4-tetrahydronaphthalene, or a pharmaceutically acceptable salt thereof; and a pharmaceutically acceptable carrier therefor.

12. A pharmaceutical composition in accordance with claim 11 in dosage unit form, each dosage unit containing from 1 to 150 mg. of said compound.

13. A pharmaceutical composition in accordance with claim 11, in a form adapted for administeration orally, rectally, or parenterally.

References Cited

UNITED STATES PATENTS

| 3,270,056 | 8/1966 | Martin et al. | 260—570.8 |
| 3,201,470 | 8/1965 | Huebner | 260—577 |
| 3,253,037 | 5/1966 | Huebner | 260—577 |

ALBERT T. MEYERS, Primary Examiner

D. M. STEPHENS, Assistant Examiner

U.S. Cl. X.R.

424—322, 325, 330